United States Patent
Zhao et al.

(10) Patent No.: US 9,726,772 B2
(45) Date of Patent: Aug. 8, 2017

(54) ITERATIVE STACKING OF SEISMIC IMAGE PARTITIONS

(71) Applicant: WESTERNGECO L.L.C., Houston, TX (US)

(72) Inventors: Chunpeng Zhao, Sugar Land, TX (US); Ruoyu Gu, Katy, TX (US); Ryan King, Sugar Land, TX (US); Alfonso Gonzalez, Sugar Land, TX (US)

(73) Assignee: WESTERNGECO L.L.C., Houston, TX (US)

( * ) Notice: Subject to any disclaimer, the term of this patent is extended or adjusted under 35 U.S.C. 154(b) by 46 days.

(21) Appl. No.: 14/515,950

(22) Filed: Oct. 16, 2014

(65) Prior Publication Data

US 2015/0110360 A1   Apr. 23, 2015

Related U.S. Application Data

(60) Provisional application No. 61/892,289, filed on Oct. 17, 2013.

(51) Int. Cl.
*G06K 9/00* (2006.01)
*G01V 1/36* (2006.01)

(52) U.S. Cl.
CPC ........ *G01V 1/362* (2013.01); *G01V 2210/322* (2013.01)

(58) Field of Classification Search
CPC .......................... G01V 2210/322; G01V 1/362
USPC .......................... 382/109; 367/14, 38; 702/14
See application file for complete search history.

(56) References Cited

U.S. PATENT DOCUMENTS

| | | | | |
|---|---|---|---|---|
| 4,561,074 A | * | 12/1985 | Warmack | G01V 1/362 367/46 |
| 5,243,563 A | | 9/1993 | Kim | |
| 5,629,904 A | * | 5/1997 | Kosloff | G01V 1/301 367/21 |
| 6,021,094 A | * | 2/2000 | Ober | G01V 1/28 367/50 |
| 6,535,818 B1 | * | 3/2003 | Baeten | G01V 1/362 702/17 |
| 6,819,628 B2 | | 11/2004 | Tal-Ezer | |

(Continued)

OTHER PUBLICATIONS

Compton, et al., "3D nonlinear stack enhancement: Correlation based stacking", SEG Technical Program Expanded Abstracts, SEG Las Vegas 2012 Annual Meeting, 5 pages.

(Continued)

*Primary Examiner* — John Strege

(57) ABSTRACT

Systems, media, and methods for processing seismic data are disclosed. For example, in one embodiment, the method may include receiving a plurality of partial image partitions of a migrated seismic image, and stacking the plurality of partial image partitions such that a first image is generated. The method may also include aligning the plurality of partial image partitions based at least partially on the first image. Aligning may include adjusting at least one of the plurality of partial image partitions and generating a displacement field. The method may also include, based at least in part on the displacement field, stacking the plurality of aligned partial image partitions to generate a second image. The method may further include based at least in part on the second image, realigning the plurality of aligned partial image partitions.

22 Claims, 10 Drawing Sheets

(56) References Cited

U.S. PATENT DOCUMENTS

| | | | |
|---|---|---|---|
| 7,626,887 | B2 | 12/2009 | Aarre et al. |
| 8,121,791 | B2* | 2/2012 | Lazaratos ............... G01V 1/28 166/369 |
| 8,380,440 | B2 | 2/2013 | Aarre et al. |
| 2003/0031091 | A1 | 2/2003 | Kim et al. |
| 2004/0093163 | A1 | 5/2004 | Reshef et al. |
| 2005/0232077 | A1* | 10/2005 | Marmalyevskyy ...... G01V 1/28 367/47 |
| 2005/0237857 | A1 | 10/2005 | Jiao et al. |
| 2008/0120037 | A1* | 5/2008 | Duren .................... G01V 1/364 702/17 |
| 2009/0299639 | A1* | 12/2009 | Aarre .................... G01V 1/362 702/17 |
| 2013/0030709 | A1 | 1/2013 | Ferber et al. |
| 2014/0293740 | A1* | 10/2014 | Compton ............... G01V 1/362 367/11 |
| 2015/0030210 | A1* | 1/2015 | Matson .................. G01V 1/362 382/109 |
| 2015/0063066 | A1* | 3/2015 | Burnett .................. G01V 1/30 367/38 |

OTHER PUBLICATIONS

Hale, "Dynamic warping of seismic images", Geophysics, vol. 78, Issue 2, Mar. 2013, pp. S105-S115.

Liu, et al., "Stacking seismic data using local correlation", Geophysics, 74, No. 3, 2009, pp. V43-V48.

O'Briain, et al., "Improved subsalt imaging and salt interpretation by RTM scenario testing and image partitioning", 83rd Annual International Meeting, SEG, Expanded Abstracts, 2013, pp. 3856-3860.

International Search Report and Written Opinion issued in PCT/US2014/060987 on Jan. 23, 2015, 10 pages.

Sanchis, et al., "Enhanced local correlation stacking method", Geophysics, vol. 76, Issue 3, May 2011, pp. V33-V45.

Xu, et al., "Reverse time migration using vector offset output to improve subsalt imaging—A case study at the Walker Ridge GOM", SEG Technical Program Expanded Abstracts, 2011, pp. 3269-3274.

International Preliminary Report on Patentability issued in the related PCT Application PCT/US2014/060987 dated Apr. 19, 2016 (6 pages).

Communication Article 94(3) Epc issued in the related EP Application 14853505.7, dated Oct. 10, 2016 (5 pages).

Perez G. et al., "Warping restack imaged data to improve stack quality arid resolution", Geophysics, Society of Exploration Geophysicists, US, vol. 73, No. 2, Mar. 1, 2008, pp. P1-P7

Qing Xu et al., "Reverse Time Migration Using Vector Offset Output to Improve Subsalt Imaging—A case study at the Walker Ridge GOM", Proceedings of SEG Annual Meeting 2011, Nov. 30, 2011, pp. 3269-3274.

Supplementary European Search Report issued in the related EP Application 14853505.7, dated Sep. 6, 2016 (3 pages).

* cited by examiner

ITERATIVE STACKING OF SEISMIC IMAGE PARTITIONS

CROSS-REFERENCE TO RELATED APPLICATIONS

This application claims priority to U.S. Provisional Patent App. Ser. No. 61/892,289, which was filed on Oct. 17, 2013. The entirety of this provisional application is incorporated herein by reference.

BACKGROUND

In seismic data acquisition, geophones detect seismic waves and produce seismic traces therefrom. The traces may include signals produced by subterranean reflection events. Reflection events are generally representative of interfaces between two types of rock with different levels of acoustic impedance. When encountering the interface, generally speaking, a portion of the seismic wave reflects back towards the surface and is subsequently detected by the geophones.

The acquired seismic data may be processed to construct an image of the subterranean domain. Such processing generally includes migration. In simple terms, some of the reflectors represented by the signal traces may be misplaced, either in space or time, due to complexities introduced by faults, salt bodies, folding, and the like. Accordingly, migration processes have been developed that move, or migrate, the location of portions of the reflection events, again either in space or time, to a more accurate position. The migrated seismic data may then be stacked, i.e., combined, so as to form the image of the subterranean domain. Additional migration and other processes may also be undertaken after the stacking, e.g., post-stack migration.

However, the stacking process may be subject to misalignment of the seismic data. The misalignment of migrated data can be caused by imperfect velocity model. Direct stacking of misaligned data leads to unfocused, blurry image. Due to inability to distinguish signal to noise, some stacking algorithms may attempt to align signal noise instead of or in addition to the coherent signals. This may lead to inaccurate shifts of the partial images (e.g., certain portions of the seismic data), which may result in an inaccurate map of the subterranean domain.

There is a need, therefore, for systems and methods for accurately stacking post-migration partial seismic images.

SUMMARY

The above deficiencies and other problems associated with processing of collected data are reduced or eliminated by the disclosed methods and systems.

Embodiments of the disclosure may provide a method for processing seismic data. The method includes receiving a plurality of partial image partitions of a migrated seismic image, and stacking the plurality of partial image partitions such that a first image is generated. The method also includes aligning the plurality of partial image partitions based at least partially on the first image. Aligning includes adjusting at least one of the plurality of partial image partitions and generating a displacement field. The method also includes, based at least in part on the displacement field, stacking the plurality of aligned partial image partitions to generate a second image. The method further includes, based at least in part on the second image, realigning the plurality of aligned partial image partitions.

In an embodiment, the method includes determining that the second image has a higher quality than the first image. Further, realigning the plurality of aligned partial images is in response to determining that the second image has a higher quality than the first image.

In an embodiment, the method also includes causing the second image to be displayed, and determining that the second image has a higher quality than the first image is based at least in part on an analysis of the displayed second image in comparison to the first image. In an embodiment, the analysis of the displayed second image is based at least partially on a comparison of a continuity of one or more reflection events in the second image with a continuity of the one or more reflection events in the first image.

In an embodiment, the method also includes smoothing the displacement field prior to stacking the plurality of aligned image partitions.

In an embodiment, stacking the plurality of partial images includes using a weighted stacking based at least partially on a coherency of one or more signals of at least one of the plurality of partial images.

In an embodiment, stacking the plurality of aligned images includes using a weighted stacking based at least partially on a coherency of one or more signals of at least one of the plurality of partial signals.

Embodiments of the disclosure may also provide a method for processing seismic data. The method includes constructing a pilot image based on a plurality of partial image partitions of a migrated seismic image, and performing a plurality of iterations. The iterations include aligning the plurality of partial image partitions based on the pilot image to generate a plurality of aligned partial image partitions, and generating a second image, using a processor, by stacking the plurality of aligned partial image partitions based at least partially on the pilot image. The iterations also include setting the second image as the pilot image, and setting the plurality of aligned partial image partitions as the plurality of partial image partitions.

In an embodiment, aligning the plurality of partial image partitions includes generating a displacement field, and stacking the plurality of aligned partial image partitions is based at least partially on the displacement field.

In an embodiment, performing the iterations further includes smoothing the displacement field prior to stacking the plurality of aligned partial image partitions.

In an embodiment, the method also includes filtering the plurality of partial image partitions prior to performing the plurality of iterations.

In an embodiment, constructing the pilot image includes stacking the plurality of partial image partitions based at least partially on a weighted stacking.

In an embodiment, the weighted stacking is based at least partially on a coherency of one or more signals of the plurality of partial image partitions.

In an embodiment, performing the plurality of iterations further includes determining whether to perform another one of the iterations based on a comparison of the second image and the pilot image.

Embodiments of the disclosure may also provide a computing system including one or more processors, and a memory system comprising one or more non-transitory computer-readable media storing instructions that, when executed by at least one of the one or more processors, cause the computing system to perform operations. The operations include receiving a plurality of partial image partitions of a migrated seismic image, and stacking the plurality of partial image partitions such that a first image is generated. The operations also include aligning the plurality of partial image partitions based at least partially on the first image. Aligning includes adjusting at least one of the plurality of partial image partitions and generating a displacement field. The operations further include, based at least in part on the displacement field, stacking the plurality of aligned partial image partitions to generate a second image, and, based at least in part on the second image, realigning the plurality of aligned partial image partitions.

Embodiments of the disclosure may also provide a computing system including one or more processors, and a memory system comprising one or more non-transitory computer-readable media storing instructions that, when executed by at least one of the one or more processors, cause the computing system to perform operations. The operations include constructing a pilot image based on a plurality of partial image partitions of a migrated seismic image, and performing a plurality of iterations. The iterations include aligning the plurality of partial image partitions based on the pilot image to generate a plurality of aligned partial image partitions, and generating a second image, using a processor, by stacking the plurality of aligned partial image partitions based at least partially on the pilot image. The iterations also include setting the second image as the pilot image, and setting the plurality of aligned partial image partitions as the plurality of partial image partitions.

Embodiments of the disclosure may also provide non-transitory computer-readable medium storing instructions that, when executed by one or more processors of a computing system, cause the computing system to perform operations. The operations include receiving a plurality of partial image partitions of a migrated seismic image, and stacking the plurality of partial image partitions such that a first image is generated. The operations also include aligning the plurality of partial image partitions based at least partially on the first image. Aligning includes adjusting at least one of the plurality of partial image partitions and generating a displacement field. The operations further include, based at least in part on the displacement field, stacking the plurality of aligned partial image partitions to generate a second image, and, based at least in part on the second image, realigning the plurality of aligned partial image partitions.

Embodiments of the disclosure may also provide non-transitory computer-readable medium storing instructions that, when executed by one or more processors of a computing system, cause the computing system to perform operations. The operations include constructing a pilot image based on a plurality of partial image partitions of a migrated seismic image, and performing a plurality of iterations. The iterations include aligning the plurality of partial image partitions based on the pilot image to generate a plurality of aligned partial image partitions, and generating a second image, using a processor, by stacking the plurality of aligned partial image partitions based at least partially on the pilot image. The iterations also include setting the second image as the pilot image, and setting the plurality of aligned partial image partitions as the plurality of partial image partitions.

Embodiments of the disclosure may provide a computing system that includes at least one processor, at least one memory, and one or more programs stored in the at least one memory. The computing system further includes means for receiving a plurality of partial image partitions of a migrated seismic image, and means for stacking the plurality of partial image partitions such that a first image is generated. The system also includes means for aligning the plurality of partial image partitions based at least partially on the first image. The means for aligning includes means for adjusting at least one of the plurality of partial image partitions and means for generating a displacement field. The system further includes means for stacking the plurality of aligned partial image partitions, based at least in part on the displacement field, to generate a second image, and, means for realigning the plurality of aligned partial image partitions based at least in part on the second image.

Embodiments of the disclosure may provide a computing system that includes at least one processor, at least one memory, and one or more programs stored in the at least one memory. The computing system further includes means for constructing a pilot image based on a plurality of partial image partitions of a migrated seismic image, and means for performing a plurality of iterations. The means for performing the plurality of iterations include means for aligning the plurality of partial image partitions based on the pilot image to generate a plurality of aligned partial image partitions, and means for generating a second image by stacking the plurality of aligned partial image partitions based at least partially on the pilot image. The means for performing also include means for setting the second image as the pilot image, and means for setting the plurality of aligned partial image partitions as the plurality of partial image partitions.

Embodiments of the disclosure may provide a computer-readable storage medium having a set of one or more programs including instructions that when executed by a computing system cause the computing system to stack the plurality of partial image partitions such that a first image is generated. The instructions also cause the system to align the plurality of partial image partitions based at least partially on the first image. Aligning includes means for adjusting at least one of the plurality of partial image partitions and means for generating a displacement field. The instructions further cause the system to stack the plurality of aligned partial image partitions, based at least in part on the displacement field, to generate a second image, and, based at least in part on the second image, realign the plurality of aligned partial image partitions.

Embodiments of the disclosure may provide a computer-readable storage having a set of one or more programs including instructions that when executed by a computing system cause the computing system to construct a pilot image based on a plurality of partial image partitions of a migrated seismic image, and to perform a plurality of iterations. The iterations include aligning the plurality of partial image partitions based on the pilot image to generate a plurality of aligned partial image partitions, and generating a second image by stacking the plurality of aligned partial image partitions based at least partially on the pilot image. The iterations also include setting the second image as the pilot image, and setting the plurality of aligned partial image partitions as the plurality of partial image partitions Thus, the computing systems and methods disclosed herein are more effective methods for processing collected data that may, for example, correspond to a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
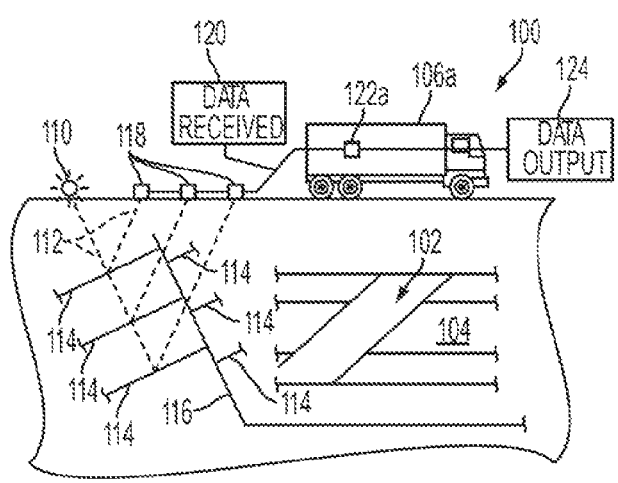
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 1B:
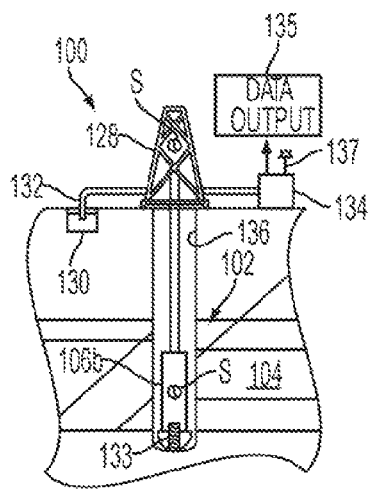

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
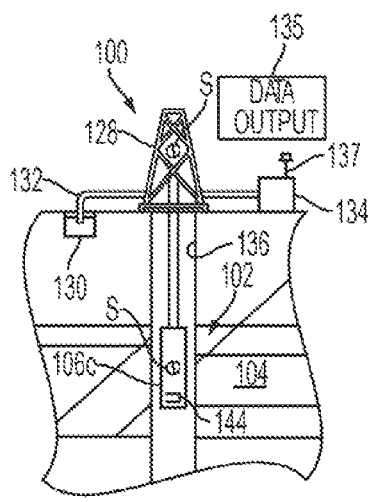

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 1D:
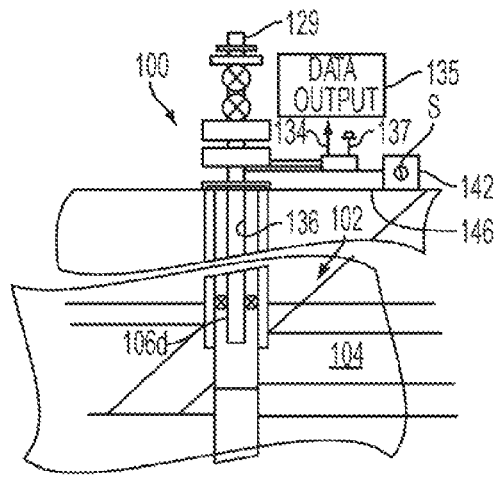

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
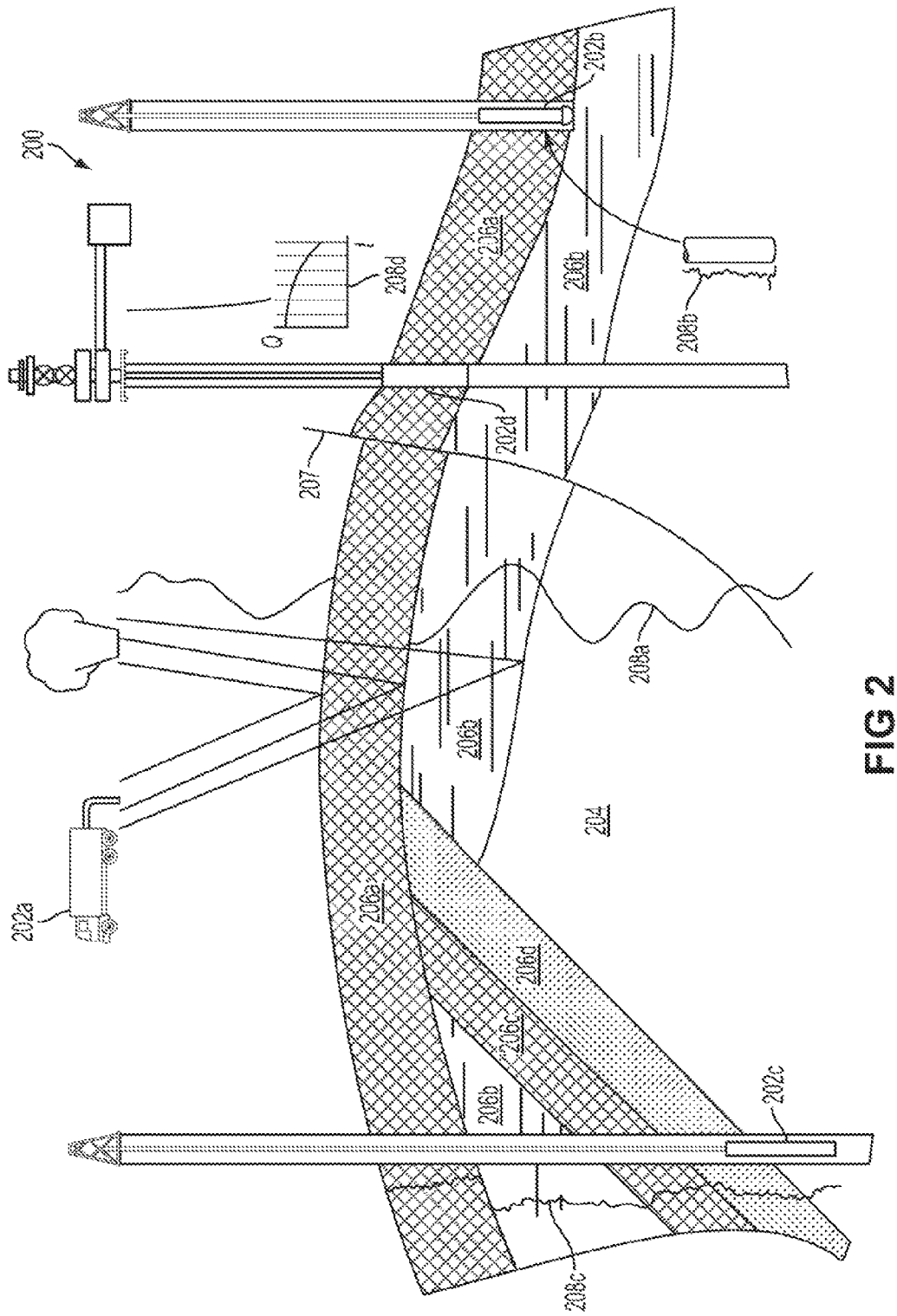

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
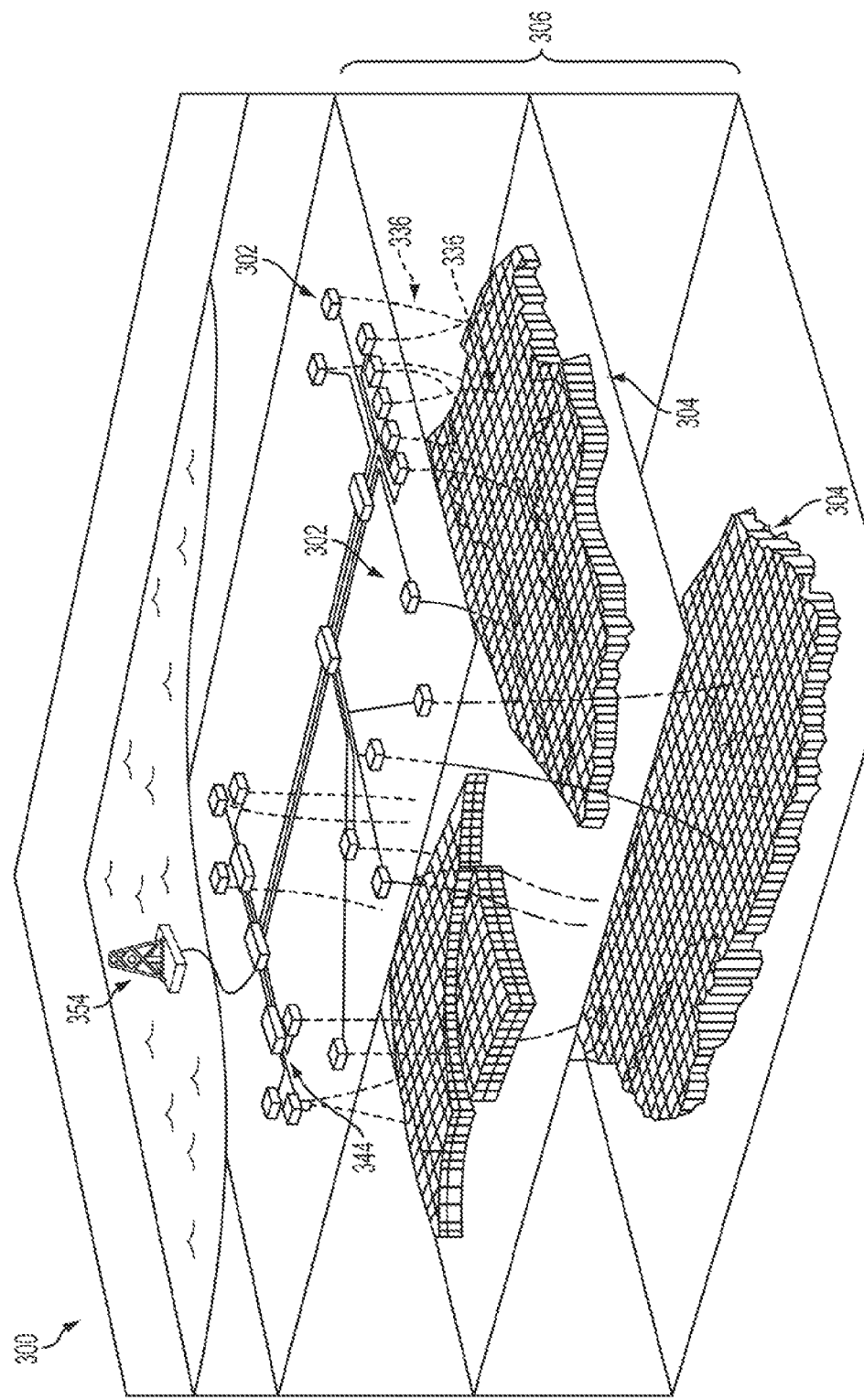

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
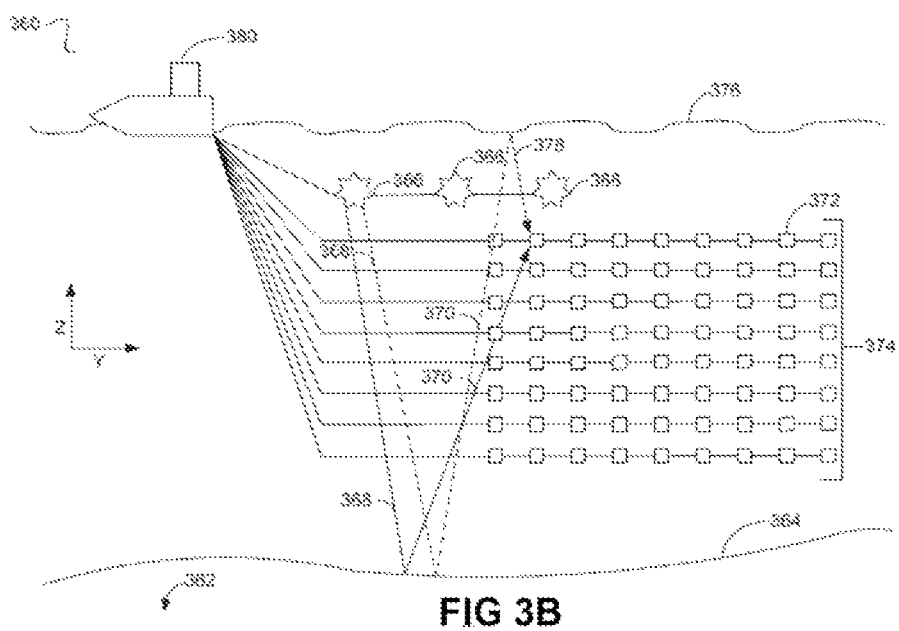

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Typically, marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to seasurface ghost waves. For instance, marine-based survey 360 of FIG. 3B illustrates eight streamers towed by vessel 380 at eight different depths. The depth of each streamer may be controlled and maintained using the birds disposed on each streamer.

Attention is now directed to FIGS. 4, 5, 6A, 6B, and 7, which are flow diagrams illustrating methods 400, 500, 600, and 700 respectively, for processing seismic data in accordance with some embodiments. Some operations in methods 400, 500, 600 and/or 700 may be combined and/or the order of some operations may be changed. Further, some operations in methods 400, 500, 600 and/or 700 may be combined with aspects of the example workflows of FIGS. 4, 5, 6 and 7, and/or the order of some operations in methods 400, 500, 600 and/or 700 may be changed to account for incorporation of aspects of the workflow illustrated by one or more of FIGS. 4, 5, 6 and 7.

Figure 4:
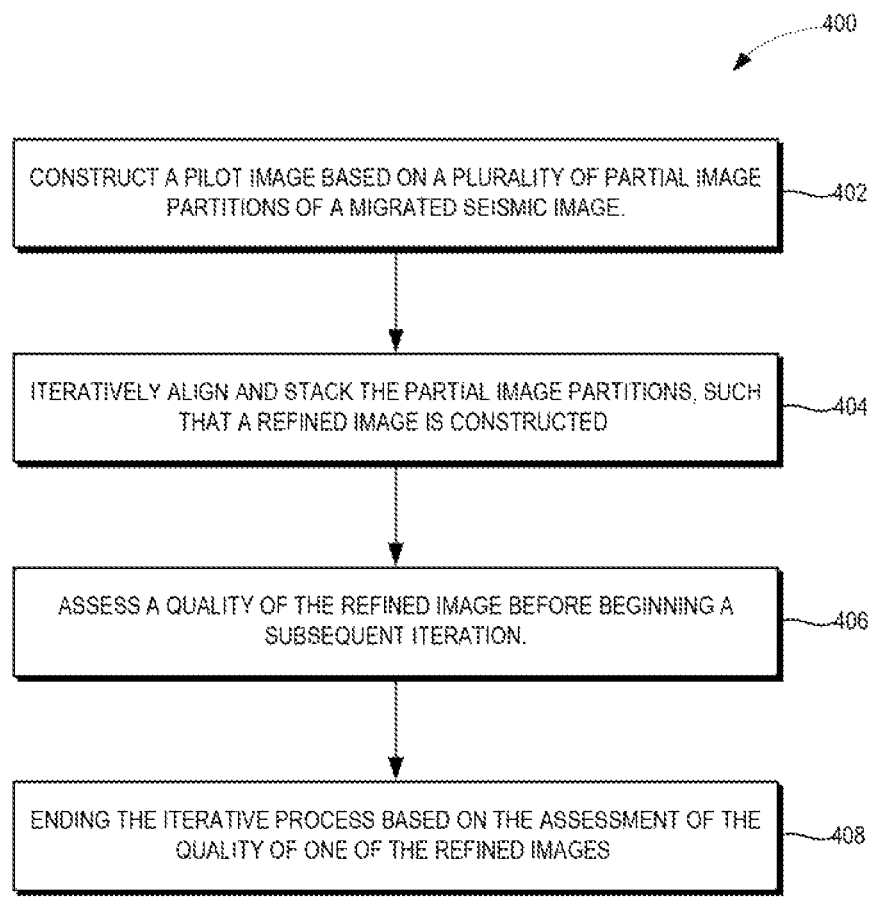
FIGS. 4, 5, 6A, 6B, and 7 illustrate flowcharts of methods for processing seismic data, according to some embodiments.

FIG. 4 illustrates a flowchart of a method 400 for processing seismic data, according to an embodiment. The method 400 may begin by constructing a pilot image based on a plurality of partial image partitions of a migrated seismic image, as at 402. That is, in some embodiments, the input seismic data may be a post-migration, partial image volume partitions (or "partial image partitions"), which may be stacked to form a seismic image of a subterranean domain. For example, the partial image partitions of the migrated image may be provided based on a common offset gather, vector image partition, or angle gather, which may be collected based on one or more physical seismic acquisition processes.

The stack of these partitions may be equivalent to the migrated image. Alignment of signals and misalignment of random noise among partitions may produce a constructive stack of signals and a destructive stack of noise. However, the alignment of signals among image partitions is often obstructed by the imperfection of the velocity model used in the migration. Further, the fine-scale velocity difference apart from the true earth is often more difficult to invert than large-scale variations, which may result in signals aligned at large scale and misaligned at fine-scale (e.g., "jittering") among partitions. This jittering within the gather may produce a stack that reduces the signal-to-noise ratio of the outcome image.

The pilot image constructed at 402 may be a three-dimensional volume image, with a large-scale structural skeleton. In constructing the pilot image, conflicting dipping signals may be analyzed by considering the individual image partitions to find the more plausible dipping direction and suppressing the other dipping direction, which may have been caused by noise, e.g., using partial stacking or weighted stacking of image partitions. Additional details regarding constructing the pilot image volume are discussed below, according to an embodiment.

The method 400 may iteratively stack the partial image partitions, such that a refined image is constructed, as at 404. For example, the refined image for one iteration may represent an enhancement, at least in terms of signal alignment, from the refined image of the previous iteration. Thus, in some embodiments, the method 400 may produce incrementally higher quality images, in at least some of the iterations.

The method 400 may also include assessing a quality of the refined image before beginning a subsequent operation, as at 406. As such, during a given iteration, e.g., at the end of the iteration, the method 400 may include considering whether the refined image produced is sufficiently accurate. This determination may be made by a human interpreter, and the quality may be based on a plurality of considerations, as will be discussed in greater detail below. Generally, however, this may represent a balance between the additional time and expense for proceeding through another iteration versus the accuracy gains that are likely to be seen, based on the accuracy gains that were seen in the incremental refinement provided by the present iteration over the past one or more iterations.

The method 400 may further include ending the iterative process based on the assessment of the quality of the one or more refined images, as at 408. For example, at the conclusion of an iteration, e.g., after a refined image has been generated, the quality assessed at 406 may be deemed to be sufficient at 408, and the iterations may terminate. The method 400 may then end, or proceed to other refinement methods, post-stack processing, etc.

Figure 5:
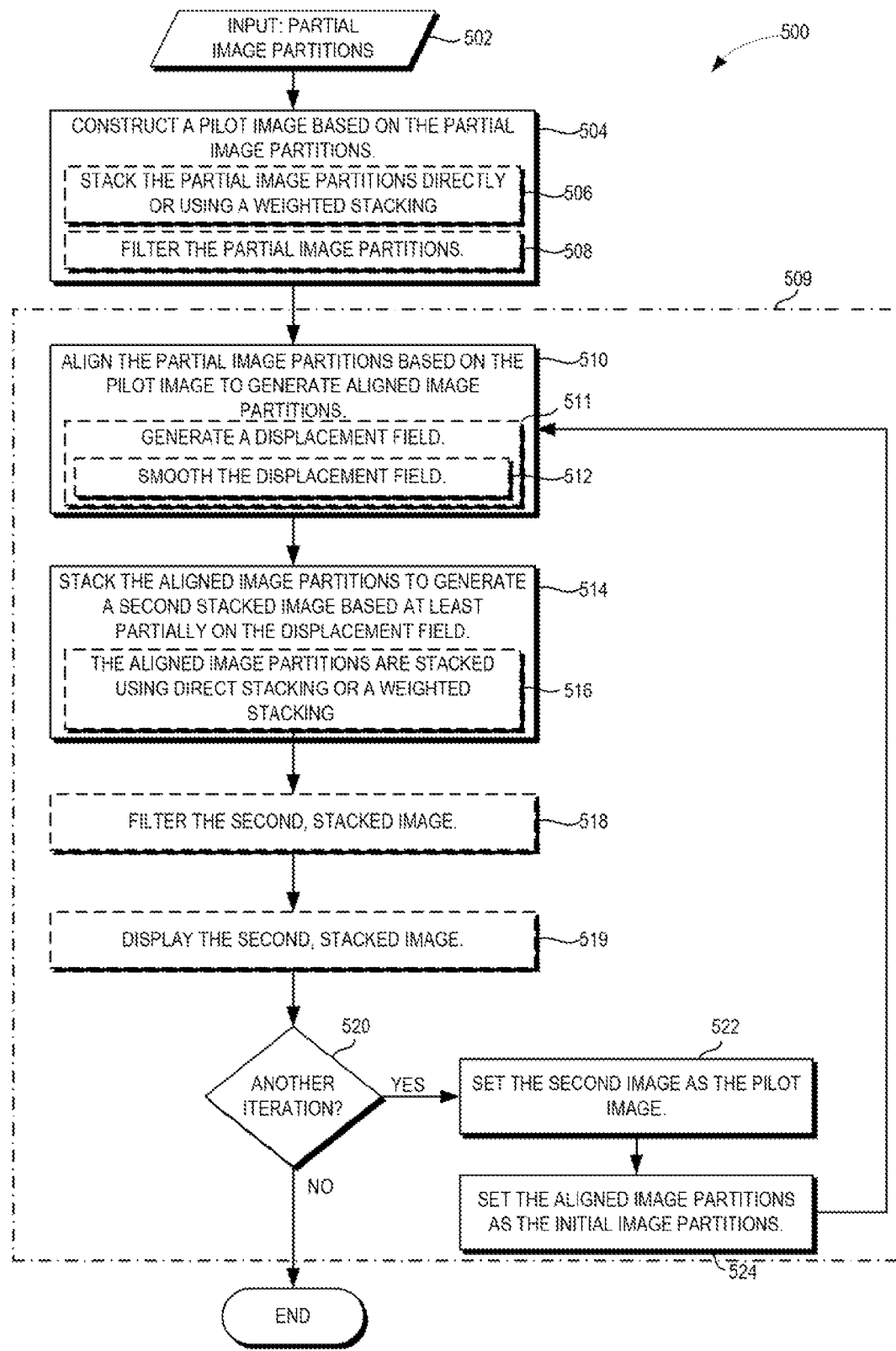

FIG. 5 illustrates a flowchart of another method 500 for processing seismic data, according to an embodiment. The method 500 may begin by receiving input in the form of initial partial image partitions, as indicated at 502. A pilot image based on the initial partial image partitions may then be constructed, as at 504.

In some embodiments, constructing the pilot image may include stacking the partial image volume partitions, as indicated at 506. The stacking may be direct or weighted. For example, when noise is relatively low, direct stacking may be used; otherwise, a weighted stacking method may be employed. The weighted stacking may be based on a coherency measurement of the signals.

The pilot image may also be filtered, e.g., as part of the stacking, as indicated 508. For example, high-frequency signals may be less accurately imaged than low-frequency signals, e.g., based on the resolution of the velocity model. Hence, filtering the input image volume from high-frequency to low-frequency may be performed, e.g., to decrease the level of details and noise. If large, organized moveouts of events with respect to azimuth or offset are apparent among image partitions, to avoid cycle-skipping during alignment process, the pilot image volume may be constructed for individual offsets and/or azimuth bins, within which the moveout may be smaller than half the wavelength.

Furthermore, a coherency-based, three-dimensional (3D) filter, e.g. Tau-p, or a wavefield reconstruction, such as a beam method, may be applied to the enhanced input image by suppressing the noise. In some embodiments, this filter may enhance the 3D coherency of signals and structures while suppressing the noise. The spatial length of the filter may be tested to achieve such enhanced coherency and noise suppression.

For noisy data, aggressive filtering and/or reconstruction of the input image volume may be performed. Examples of such filtering may include low-pass frequency filtering of image partitions to remove high-frequency noise, partial stacking of less-noisy image partitions to avoid far offset errors due to imperfection of velocity model, and aggressive, coherency-based wavefield reconstruction, e.g. Tau-p, or wavefield reconstruction like beam method. In cases of low-signal, manual interpretation of the expected geologic trends in the area may be used for scenario testing.

The method 500 may then begin an iterative loop, as at 509. It will be appreciated that the method 500 may progress through the loop 509 any number of times, including a single time, while still considering the loop 509 as part of an "iterative" embodiment of the method 500. The method 500 may begin the loop 509 by aligning the partial image partitions based on the pilot image, as at 510. The alignment may be conducted so as to produce a structurally-coherent alignment between different image partitions and the pilot image, which may focus the image, e.g., increasing the contrast (e.g., relative amplitude) and continuity of the reflection events in the wavefield.

In some embodiments, aligning the image partitions based on the pilot image volume may produce a rough, sample-by-sample displacement field, as indicated at 511. The alignment may be realized by various algorithms, e.g. cross-correlation, non-rigid-matching, and/or a time-warping algorithm, any of which or others may warp, shift, or otherwise adjust a position and/or dimension of at least one of the partial image partitions. A one-dimensional (1D) windowed trace-to-trace cross-correlation algorithm may determine static shifts among a 1D image partition gather of different azimuth or offset, but it may not account for the 3D continuous nature of the event, which may result in intra-gather cycle-skipping or alignment of noise. A two-dimensional (2D) alignment algorithm in either an inline or crossline direction may align signals while avoiding cycle-skipping or alignment of noise, but may ignore the structure in the other direction. However, displacement fields from both 1D and 2D alignment algorithms may be isotropically or anisotropically smoothed in at least some embodiments, in 3D to approximate the 3D nature of the structure. When available, a 3D image registering approach may match the 3D structure of individual image partition to a pilot image.

Accordingly, in at least some embodiments, the rough displacement field may be smoothed in 3D, e.g., to suppress noise-induced shifts, while enhancing signal related shifts, as at 512. Artifacts introduced by alignment may result from cycle-skipping and alignment of noise. 3D smoothing of the displacement field may at least partially suppress such artifacts. Depending on the alignment algorithm used and the structural detail to be achieved, the strength of 3D smoothing may differ, e.g., as between iterations of the loop 509. For example, a heavy smoothing filter may be used for the first iteration, e.g., to establish the large-scale structure, and then weaker smoothing filters may be applied in later iterations to bring out additional structural details. Isotropic or anisotropic smoothing algorithms may also be used to smooth the displacement field in 3D. When available, a structural guided 3D smoothing algorithm may be used. The smoothed displacement field for each image partition volume may be applied to produce aligned image partition volumes.

Further, in some embodiments, the method 500 may additionally include determining whether large-scale velocity model error is present, which, if present, may limit or reduce the effectiveness of the remainder of the method 500. Such error may be identified by checking the displacement field for large-scale and organized patterns.

The aligned image partition volumes may then be stacked, such that a refined second stacked image volume (or "second image") is generated, as at 514. The aligned partial image partition volumes may be stacked directly or using coherency-based weighting, based on the pilot image as a reference, as at 516. In the latter example, a coherency or cross-correlation coefficient between the pilot image volume and the individual image partition volumes may be transformed to a weight for each sample of each image partition, e.g., to suppress at least a portion of any present noise.

The second image may, in some embodiments, also be filtered, as at 518. Depending on the quality of the enhanced stack image, among other potential factors, a coherency-based 3D filter, e.g. Tau-p, or wavefield reconstruction such as a beam method may be applied to the enhanced stack image to further suppress the noise. This filter may increase the 3D coherency of the signals and structures, while suppressing at least some of the noise. The spatial length of this filter may be tested to achieve such coherency increase and noise suppression.

The resulting, second stacked image may then be displayed, as at 519. Based on such a display, and/or relevant quantitative data, the resulting stack image may be evaluated or assessed to determine whether a subsequent iteration should be performed, as at 520. This determination may be made automatically or by a human interpreter. Further, the determination may be made based on a quality of the second image, whether alone or in comparison with the pilot image. In the latter example, the comparison may include determining the quality gains realized by the present iteration over the prior pilot image. This gain may, in some embodiments, be assumed to be representative of the maximum gain that would be seen in a subsequent iteration.

In some embodiments, the comparison of the second and pilot image volumes may be based on a quality of the characteristics of the reflection events in the image volumes. For example, the amplitude contrast of the reflection events versus a remainder of the wavefield may indicate an enhancement of the image. Further, an increased continuity of the events, which, apart from a fault, may generally be assumed to be continuous. A variety of other factors, whether qualitative or quantitative, may also be considered, so as to determine the quality gains in the second image over the pilot image. When the two images are determined to be close enough (e.g., gains sufficiently small) such that a subsequent iteration through the loop 509 is determined not to be justified, the method 500 may end, or proceed to other processing techniques, output, etc. It will be appreciated that the determination of quality, the determination of the characteristics employed to determine quality, and/or a comparison of the two images may be automated (e.g., performed at least in part by operation of a computer), and/or by a human operator.

When the determination is made to conduct another iteration, however, the method 500 may set the second image as the pilot image, as at 522, and set the aligned partial image partitions as the initial partial image partitions, as at 524. The method 500 may then return to aligning the partial image partitions based on the pilot image at 510, and proceed through another iteration of the loop 509. As such, the result of the previous iteration may be used as the input for subsequent iterations.

Accordingly, the iterative method 500 may facilitate gradually enhancing coherent signals and suppressing noise, without creating artificial signals from cycle-skipping and/or alignment of noise. Embodiments of the method 500 may search for 3D coherent structures among image partitions and gradually (e.g., over one or several iterations) align them to enhance their presence in the final stacked image. This approach may address small misalignments of structures between partial image partitions induced by relatively low resolution of the velocity model used in the migration process. For example, the heterogeneous Earth structure may be poorly approximated by the velocity model, and thus embodiments of the method 500 may gradually mitigate such poor approximation, e.g., iteratively, until reaching an image of acceptable quality.

Figure 6A:
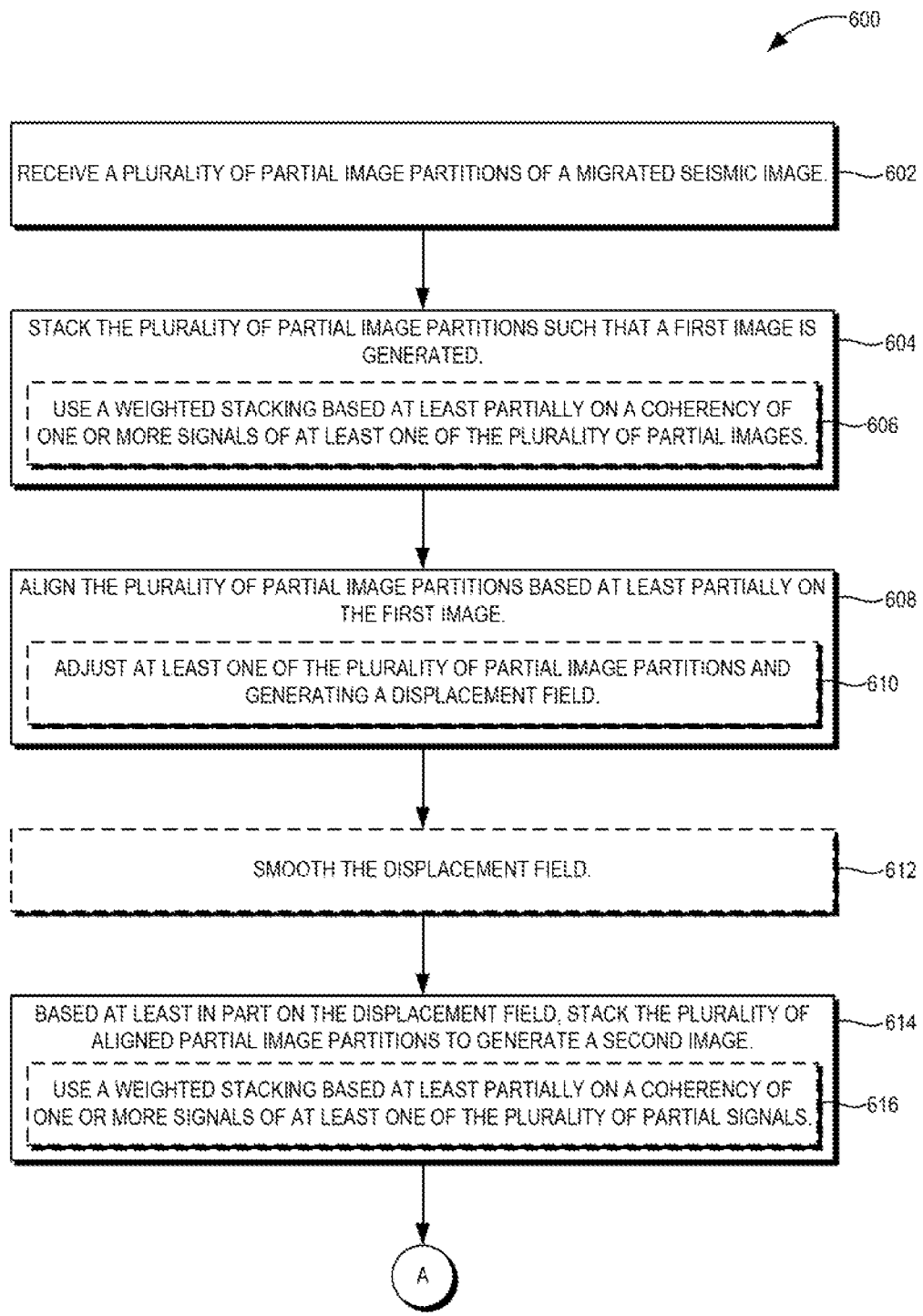
Figure 6B:
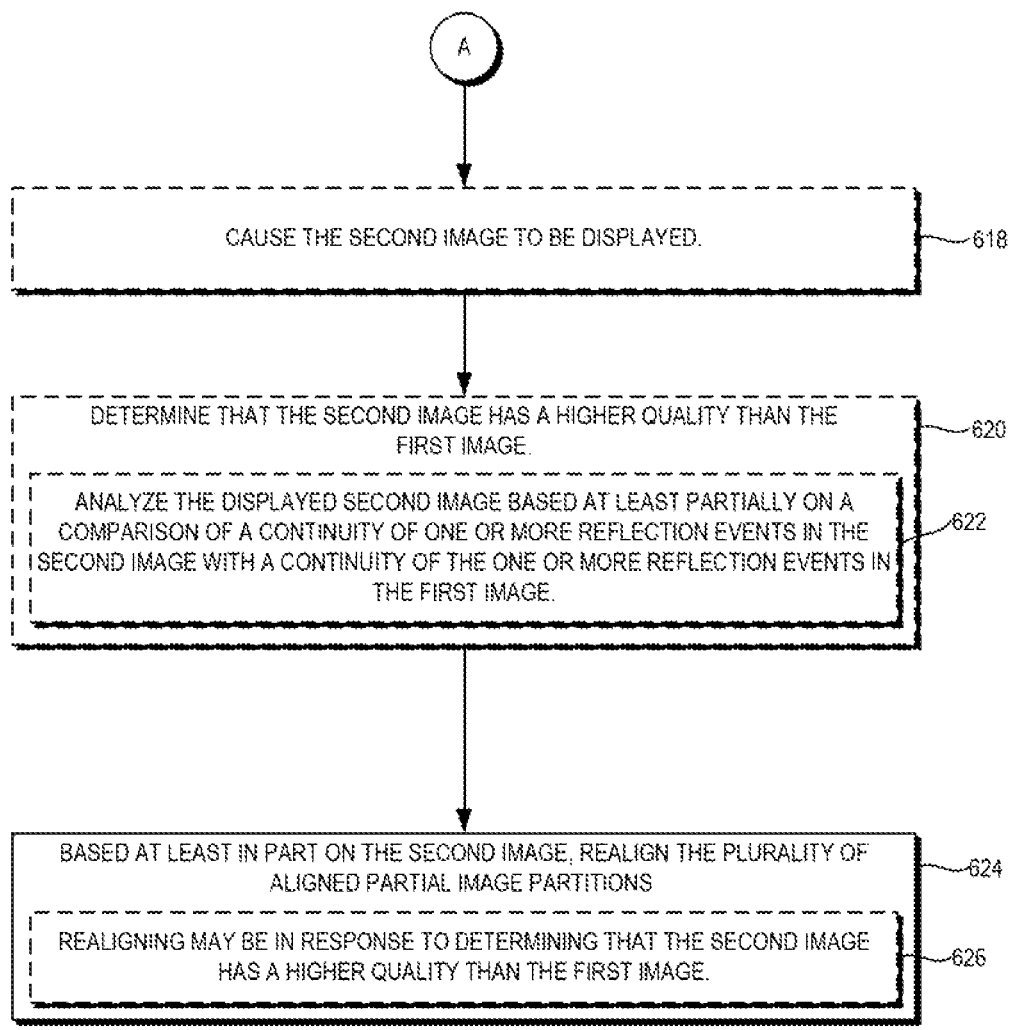

FIG. 6A illustrates a flowchart of a method 600 for processing seismic data, according to an embodiment. The method 600 may include receiving a plurality of partial image partitions of a migrated seismic image, as at 602 (e.g., FIG. 5, 502; partial image partitions are received as input). The method 600 may also include stacking the plurality of partial image partitions such that a first image is generated, as at 607 (e.g., FIG. 5, 506; the partial image partitions may be stacked). In an embodiment, stacking the plurality of partial images at 604 may include using a weighted stacking based at least partially on a coherency of one or more signals of at least one of the plurality of partial images, as at 606 (e.g., FIG. 5, 506; the partial image partitions may be stacked using direct or weighted stacking).

The method 600 may further include aligning the plurality of partial image partitions based at least partially on the first image, as at 608 (e.g., FIG. 5, 510; aligning the partial image partitions). In an embodiment, aligning at 608 may include adjusting at least one of the plurality of partial image partitions and generating a displacement field, as indicated at 610 (e.g., FIG. 5, 510; aligning may include adjusting at least one of the plurality of partial image partitions; e.g., FIG. 5, 511, a displacement field is generated as part of aligning the partial image partitions). In an embodiment, the method 600 may also include smoothing the displacement field, e.g., prior to stacking the plurality of aligned image partitions, as at 612 (e.g., FIG. 5, 512; the displacement field may be smoothed).

Further, the method 600 may include based at least in part on the displacement field, stacking the plurality of aligned partial image partitions to generate a second image, as at 614 (e.g., FIG. 5, 514; stacking the aligned image partitions). In an embodiment, stacking the plurality of aligned images may include using a weighted stacking based at least partially on a coherency of one or more signals of at least one of the plurality of partial signals, as at 616 (e.g., FIG. 5, 516; the aligned image partitions may be stacked directly or using a weighted stacking).

In an embodiment, the method 600 may also include causing the second image to be displayed, as at 618 (e.g., FIG. 5, 519; the second image is displayed). The method 600 may also, in an embodiment, include determining that the second image has a higher quality than the first image, as at 620 (e.g., FIG. 5, 520; the determination of whether to perform another iteration considers the relative quality of the second image over the first image). In an embodiment, determining that the second image has a higher quality than the first image may be based at least in part on an analysis of the displayed second image, as at 622 (e.g., FIG. 5, 520; the determination of whether to perform another iteration considers the relative quality of the second image over the first image). For example, the analysis of the displayed second image may be based at least partially on a comparison of a continuity of one or more reflection events in the second image with a continuity of the one or more reflection events in the first image (e.g., FIG. 5; 520; the determination of whether to perform another iteration may be based on a continuity of the reflection events).

Further, the method 600 may also include, based at least in part on the second image, realigning the plurality of aligned partial image partitions, as at 624. In an embodiment, realigning at 624 may be in response to determining that the second image has a higher quality than the first image, as indicated at 626 (e.g., FIG. 5, 510; the loop 509 returns to aligning at 510).

Figure 7:
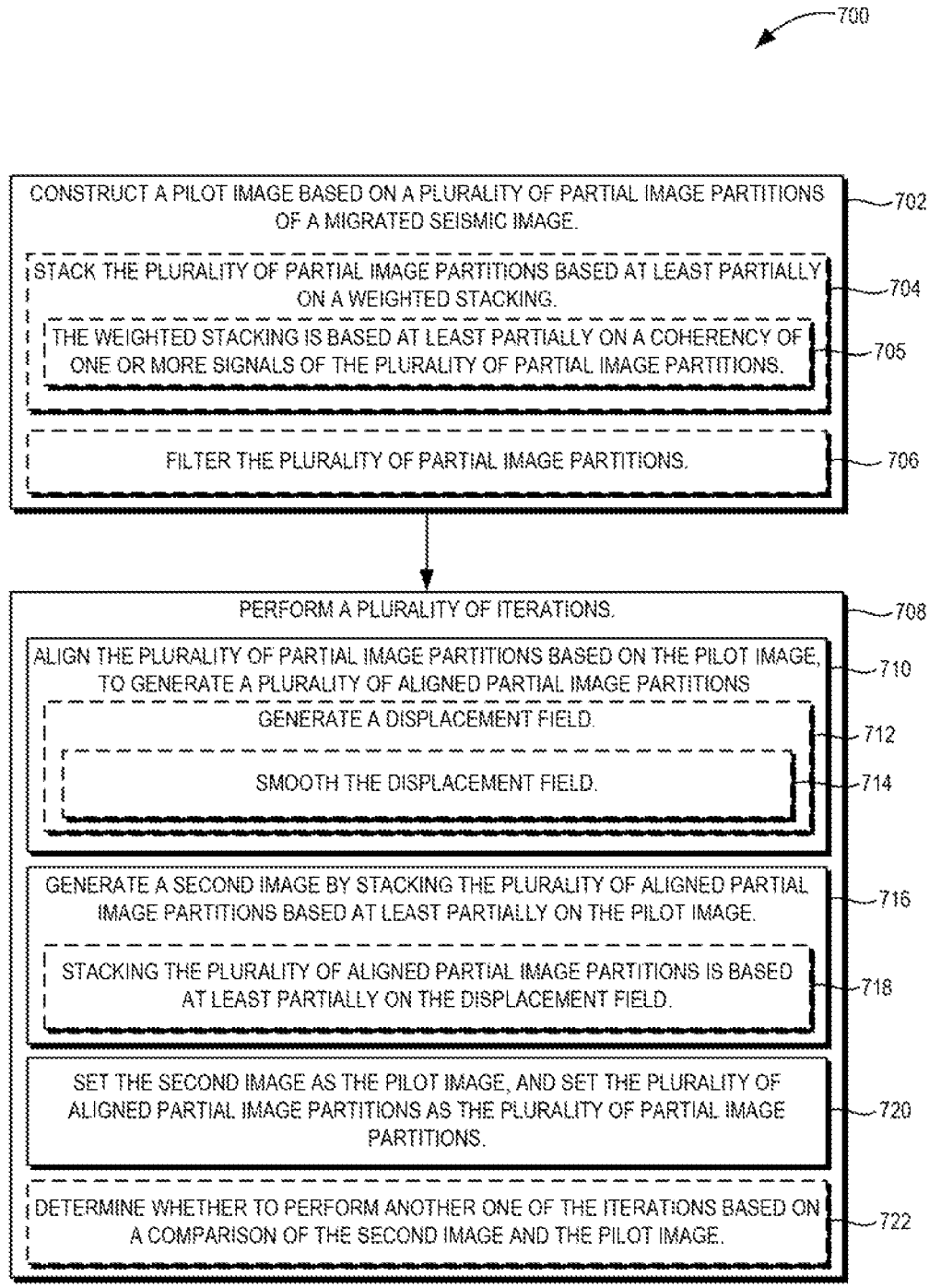

FIG. 7 illustrates a flowchart of a method 700 for processing seismic data, according to an embodiment. The method 700 may include constructing a pilot image based on a plurality of partial image partitions of a migrated seismic image, as at 702 (e.g., FIG. 5, 504; a pilot image is constructed based on the partial image partitions). In an embodiment, constructing the pilot image at 702 may include stacking the plurality of partial image partitions based at least partially on a weighted stacking, as at 704 (e.g., FIG. 5, 506; the partial image partitions are stacked directly or using a weighted stacking). In an embodiment, the weighted stacking may be based at least partially on a coherency of one or more signals of the plurality of partial image partitions, as at 705 (e.g., FIG. 5, 506; the weighted stacking may be based at least partially on signal coherency). In an embodiment, constructing the pilot image at 702 may also include filtering the plurality of partial image partitions, as at 706 (e.g., FIG. 5, 508; the partial image partitions are filtered).

The method 700 may also include performing a plurality of iterations, as at 708 (e.g., FIG. 5, 509; an iterative loop is defined). Performing the iterations at 708 may include aligning the plurality of partial image partitions based on the pilot image, to generate a plurality of aligned partial image partitions, as at 710 (e.g., FIG. 5, 510, the partial image partitions are aligned based on the pilot image). In an embodiment, aligning the plurality of partial image partitions may include generating a displacement field, as at 712 (e.g., FIG. 5, 511; a displacement field is generated). In an embodiment, performing the iterations at 708 may include smoothing the displacement field prior to stacking the plurality of aligned partial image partitions, as at 714 (e.g., FIG. 5, 512, the displacement field is smoothed).

Performing the iterations at 708 may also include generating a second image by stacking the plurality of aligned partial image partitions based at least partially on the pilot image, as at 716 (e.g., FIG. 5, 514; the aligned image partitions are stacked to generate the second image). In an embodiment, stacking the plurality of aligned partial image partitions may be based at least partially on the displacement field, as at 718 (e.g., FIG. 5, 514; the stacking is based at least partially on the displacement field).

Performing the plurality of iterations at 708 may further include setting the second image as the pilot image, and the plurality of aligned partial image partitions as the plurality of partial image partitions, as at 720 (e.g., FIG. 5, 522 and 524; the second image is set as the pilot image and the aligned image partitions are set as the initial image partitions, which are then used as the basis for the next iteration). In some embodiments, performing the plurality of iterations at 708 may also include determining whether to perform another one of the iterations based on a comparison of the second image and the pilot image, as at 722 (e.g., FIG. 5, 520; the determination as to whether to conduct another iteration includes comparing the second image and the pilot image).

Figure 8:
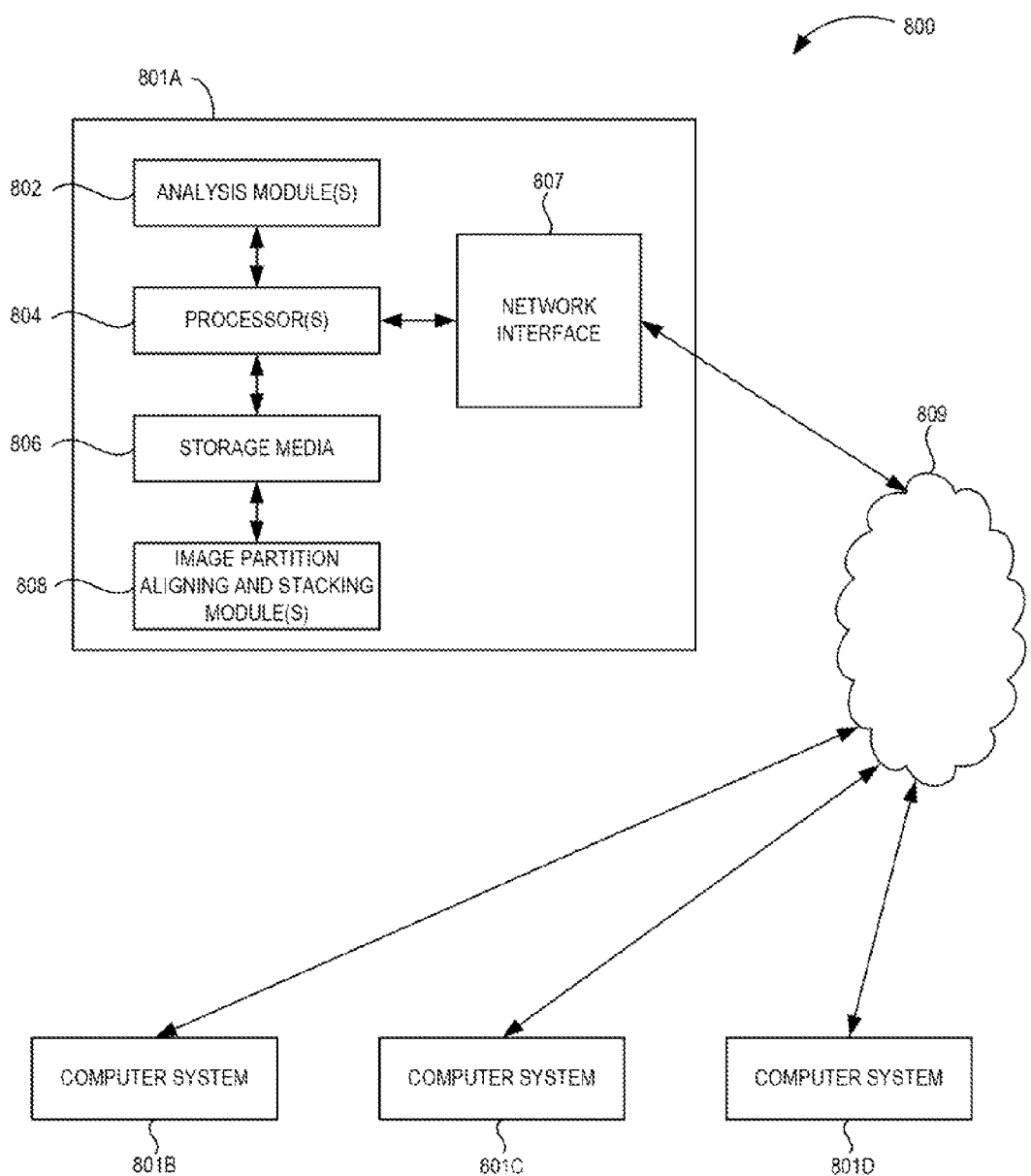
FIG. 8 illustrates a schematic view of a computing system, according to an embodiment.

In some embodiments, any of the methods 400-700 may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis module(s) 802 configured to perform various tasks according to some embodiments, such as one or more methods disclosed herein (e.g., methods 400-700, and/or combinations and/or variations thereof). To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more image partition aligning and stacking module(s) 808. In the example of computing system 800, computer system 801A includes the image partition aligning and stacking module 808. In some embodiments, a single image partition and aligning module may be used to perform some or all aspects of one or more embodiments of the methods 400-700. In alternate embodiments, a plurality of image partition aligning and stacking modules may be used to perform some or all aspects of methods 400-700.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

It is important to recognize that geologic interpretations, models and/or other interpretation aids may be refined in an iterative fashion; this concept is applicable to methods 400-700 as discussed herein. This can include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods 400-700 are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for processing seismic data, comprising:
   receiving a plurality of partial image partitions of a migrated seismic image;
   stacking the plurality of partial image partitions such that a first image is generated;
   aligning the plurality of partial image partitions based at least partially on the first image, wherein aligning comprises adjusting at least one of the plurality of partial image partitions and generating a displacement field, and wherein during the alignment of the plurality of image partitions, the first image is constructed for individual offsets, azimuth bins, or a combination thereof;
   based at least in part on the displacement field, stacking the plurality of aligned partial image partitions to generate a second image; and
   based at least in part on the second image, realigning the plurality of aligned partial image partitions.

2. The method of claim 1, further comprising determining that the second image has a higher quality than the first image, and
   wherein realigning the plurality of aligned partial images is in response to determining that the second image has a higher quality than the first image.

3. The method of claim 2, further comprising causing the second image to be displayed, and
wherein determining that the second image has a higher quality than the first image is based at least in part on an analysis of the displayed second image in comparison to the first image.

4. The method of claim 3, wherein the analysis of the displayed second image is based at least partially on a comparison of a continuity of one or more reflection events in the second image with a continuity of the one or more reflection events in the first image.

5. The method of claim 1, further comprising smoothing the displacement field prior to stacking the plurality of aligned image partitions.

6. The method of claim 1, wherein stacking the plurality of partial images comprises using a weighted stacking based at least partially on a coherency of one or more signals of at least one of the plurality of partial images.

7. The method of claim 1, wherein stacking the plurality of aligned images comprises directly stacking the plurality of aligned images.

8. A computing system, comprising:
one or more processors; and
a memory system comprising one or more non-transitory computer-readable media storing instructions that, when executed by at least one of the one or more processors, cause the computing system to perform operations, the operations comprising:
receiving a plurality of partial image partitions of a migrated seismic image;
stacking the plurality of partial image partitions such that a first image is generated;
aligning the plurality of partial image partitions based at least partially on the first image, wherein aligning comprises adjusting at least one of the plurality of partial image partitions and generating a displacement field, and wherein during the alignment of the plurality of image partitions, the first image is constructed for individual offsets, azimuth bins, or a combination thereof;
based at least in part on the displacement field, stacking the plurality of aligned partial image partitions to generate a second image; and
based at least in part on the second image, realigning the plurality of aligned partial image partitions.

9. The system of claim 8, wherein the operations further comprise determining that the second image has a higher quality than the first image, wherein realigning the plurality of aligned partial images is in response to determining that the second image has a higher quality than the first image.

10. The system of claim 9, wherein the operations further comprise causing the second image to be displayed, wherein determining that the second image has a higher quality than the first image is based at least in part on an analysis of the displayed second image.

11. The system of claim 8, wherein the operations further comprise smoothing the displacement field prior to stacking the plurality of aligned image partitions.

12. The system of claim 8, wherein stacking the plurality of partial images comprises using a weighted stacking based at least partially on a coherency of one or more signals of at least one of the plurality of partial images.

13. The system of claim 8, wherein stacking the plurality of aligned images comprises directly stacking the plurality of aligned images.

14. A non-transitory computer-readable medium storing instructions that, when executed by at least one processor of a computing system, cause the computing system to perform operations, the operations comprising:
receiving a plurality of partial image partitions of a migrated seismic image;
stacking the plurality of partial image partitions such that a first image is generated;
aligning the plurality of partial image partitions based at least partially on the first image, wherein aligning comprises adjusting at least one of the plurality of partial image partitions and generating a displacement field, and wherein during the alignment of the plurality of image partitions, the first image is constructed for individual offsets, azimuth bins, or a combination thereof;
based at least in part on the displacement field, stacking the plurality of aligned partial image partitions to generate a second image; and
based at least in part on the second image, realigning the plurality of aligned partial image partitions.

15. The medium of claim 14, wherein the operations further comprise determining that the second image has a higher quality than the first image, wherein realigning the plurality of aligned partial images is in response to determining that the second image has a higher quality than the first image.

16. The medium of claim 15, wherein the operations further comprise causing the second image to be displayed, wherein determining that the second image has a higher quality than the first image is based at least in part on an analysis of the displayed second image.

17. The medium of claim 14, wherein the operations further comprise smoothing the displacement field prior to stacking the plurality of aligned image partitions.

18. The medium of claim 14, wherein stacking the plurality of partial images comprises using a weighted stacking based at least partially on a coherency of one or more signals of at least one of the plurality of partial images.

19. The medium of claim 14, wherein stacking the plurality of aligned images comprises directly stacking the plurality of aligned images.

20. The method of claim 1, wherein during the alignment of the plurality of image partitions, the first image is constructed for individual offsets, azimuth bins, or a combination thereof, within which a moveout is smaller than half of a wavelength of the first image.

21. The method of claim 1, further comprising smoothing the displacement field, wherein a strength of the smoothing of the displacement field differs between at least two iterations.

22. The method of claim 21, wherein a first smoothing filter is used for a first iteration, a second smoothing filter is used for a second iteration, and the first filter is heavier than the second filter.

* * * * *